(12) United States Patent
Satou et al.

(10) Patent No.: US 7,273,677 B2
(45) Date of Patent: Sep. 25, 2007

(54) CATIONIC CONDUCTOR

(75) Inventors: Akira Satou, Hitachiomiya (JP); Shin Nishimura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/516,605

(22) Filed: Sep. 7, 2006

(65) Prior Publication Data

US 2007/0003832 A1     Jan. 4, 2007

Related U.S. Application Data

(62) Division of application No. 11/166,265, filed on Jun. 27, 2005, now Pat. No. 7,125,629.

(30) Foreign Application Priority Data

Jun. 28, 2004    (JP)   ............................ 2004-189098

(51) Int. Cl.
     *H01M 4/02*       (2006.01)
(52) U.S. Cl. ...................... 429/209; 429/303; 429/305; 429/306; 429/309; 429/322
(58) Field of Classification Search ................ 429/209, 429/303, 306, 322, 305, 309
See application file for complete search history.

(56) References Cited

U.S. PATENT DOCUMENTS

| | | | |
|---|---|---|---|
| 4,569,734 A | 2/1986 | Naarmann et al. | |
| 5,188,783 A | 2/1993 | Pierce | |
| 5,368,959 A | 11/1994 | Koksbang et al. | |
| 5,536,601 A | 7/1996 | Koksbang et al. | |
| 5,565,536 A | 10/1996 | Nishimura et al. | |
| 6,811,878 B2 | 11/2004 | Kawamura et al. | |
| 2003/0194610 A1* | 10/2003 | Nishimura et al. | 429/209 |

* cited by examiner

*Primary Examiner*—David W. Wu
*Assistant Examiner*—Michael Bernshteyn
(74) *Attorney, Agent, or Firm*—Antonelli, Terry, Stout & Kraus, LLP.

(57) ABSTRACT

The present invention provides a cationic conductor comprising a block copolymer comprising: a polymer moiety having a structural unit represented by formula (1):

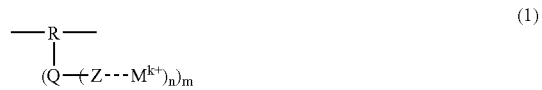

wherein R represents an organic group obtained via polymerization of monomer compounds having polymerizable unsaturated linkages; Q represents an n+1-valence organic group bonded to R through a single bond; Z represents a functional group capable of forming an ionic bond to or having coordination ability to a cation; $M^{k+}$ represents a k-valence cation; and n and m are each independently an integer of 1 or larger, provided that Z forms an ionic or coordination bond to a cation; and a polymer moiety having addition polymerizable monomers.

8 Claims, 4 Drawing Sheets

CATIONIC CONDUCTOR

CROSS-REFERENCE TO RELATED APPLICATION

This application is a divisional application of U.S. application Ser. No. 11/166,265, filed Jun. 27, 2005 now U.S. Pat. No. 7,125,629, the contents of which are incorporated herein by reference.

BACKGROUND OF THE INVENTION

1. Technical Field

The present invention relates to an ionic conductive organic electrolyte and an ionic conductive polymer electrolyte.

2. Description of Related Art

Advances in electronics have allowed the performances of electronic devices to be enhanced, and electronic devices have been miniaturized and made portable. Accordingly, secondary batteries with high energy density have been needed as power sources for such devices. In response to such need, nonaqueous electrolyte system secondary batteries with significantly enhanced energy density, i.e., lithium ion secondary batteries with organic electrolytic solution (hereafter simply referred to as "lithium batteries"), have been developed, and they have become widely prevalent in recent years. Lithium batteries use, for example, lithium metal complex oxides such as lithium-cobalt complex oxides as positive electrode active materials. They primarily use as their negative electrode active materials multilayered carbon materials capable of intercalating lithium ions in the layered structure (formation of lithium intercalation compounds) and deintercalating lithium ions out of the layered structure.

Lithium batteries use a combustible organic electrolytic solution. Thus, securing of safety in the case of overuse, such as overcharge or over-discharge, is becoming difficult with the enhancement in energy density of the batteries. Accordingly, lithium polymer batteries in which the combustible organic electrolytic solution has been replaced with a solid lithium-ionic conductive polymer were developed.

A mechanism of an ionic conductive polymer for conducting ions that has heretofore been examined is known to occur in conjunction with the motion of a polymer molecular chain. Ionic conductivity is governed by mobility of the molecular chain and by motion of a molecular chain having high activation energy, which is required for segmental motion. Thus, ionic conductivity at room temperature is approximately $10^{-4}$ Scm$^{-1}$, but it becomes significantly lower as the temperature drops.

The present inventors conceived of the application of single bond rotation with low activation energy to a mechanism for conducting ions that is not governed by motion of a molecular chain.

An organic group having a functional group, which is a ligand coordinated to a lithium ion, is bonded to another organic group through a single bond, and thus, free rotation can be realized in a wide temperature range. This rotation allows lithium ion exchange between adjacent similar functional groups, and ions are conducted via such exchange. This mechanism of conducting ions has allowed realization of the preparation of a polymer electrolyte having excellent temperature dependence (JP Patent Publication (Kokai) No. 2004-6273 A).

SUMMARY OF THE INVENTION

Polymerization of a monomer having an organic group that has a functional group that is a ligand coordinated to a lithium ion and affects ionic conduction has allowed realization of the production of an ionic conductor that utilizes single bond rotation. In order to put it to practical use, however, ionic conductivity must be enhanced.

In order to solve such problem, the following cationic conductors comprising polymer electrolytes are used.

A cationic conductor comprising a block copolymer comprising: a polymer moiety having a structural unit represented by formula (1):

(1)

wherein R represents an organic group obtained via polymerization of monomer compounds having polymerizable unsaturated linkages; Q represents an n+1-valence organic group bonded to R through a single bond; Z represents a functional group capable of forming an ionic bond to or having coordination ability to a cation; $M^{k+}$ represents a k-valence cation; and n and m are each independently an integer of 1 or larger, provided that Z forms an ionic or coordination bond to a cation; and a polymer moiety having addition polymerizable monomers.

A cationic conductor comprising an alternating copolymer represented by formula (3):

(3)

wherein $R_1$ and $R_2$ each independently represent an organic group obtained via polymerization of monomer compounds having addition polymerizable unsaturated linkages; Q represents an n+1-valence organic group bonded to $R_1$ through a single bond; Z represents a functional group capable of forming an ionic bond to or having coordination ability to a cation; $M^{k+}$ represents a k-valence cation; n and m are each independently an integer of 1 or larger; and i represents the polymerization degree, provided that Z forms an ionic or coordination bond to a cation.

A cationic conductor composed of a mixture of a polymer represented by formula (5):

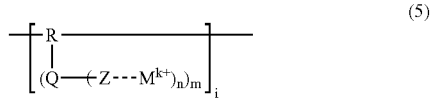

(5)

wherein R represents an organic group obtained via polymerization of monomer compounds having polymerizable unsaturated linkages; Q represents an n+1-valence organic group bonded to R through a single bond; Z represents a functional group capable of forming an ionic bond to or having coordination ability to a cation; $M^{k+}$ represents a k-valence cation; and n and m are each independently an integer of 1 or larger, provided that Z forms an ionic or coordination bond to a cation; and a different type of polymer.

According to the present invention, an electrolyte having excellent ionic conductivity can be obtained.

This specification includes part or all of the contents as disclosed in the specifications of Japanese Patent application No. 2004-189098, which are the base of the priority claim of the present application.

Figure 1:
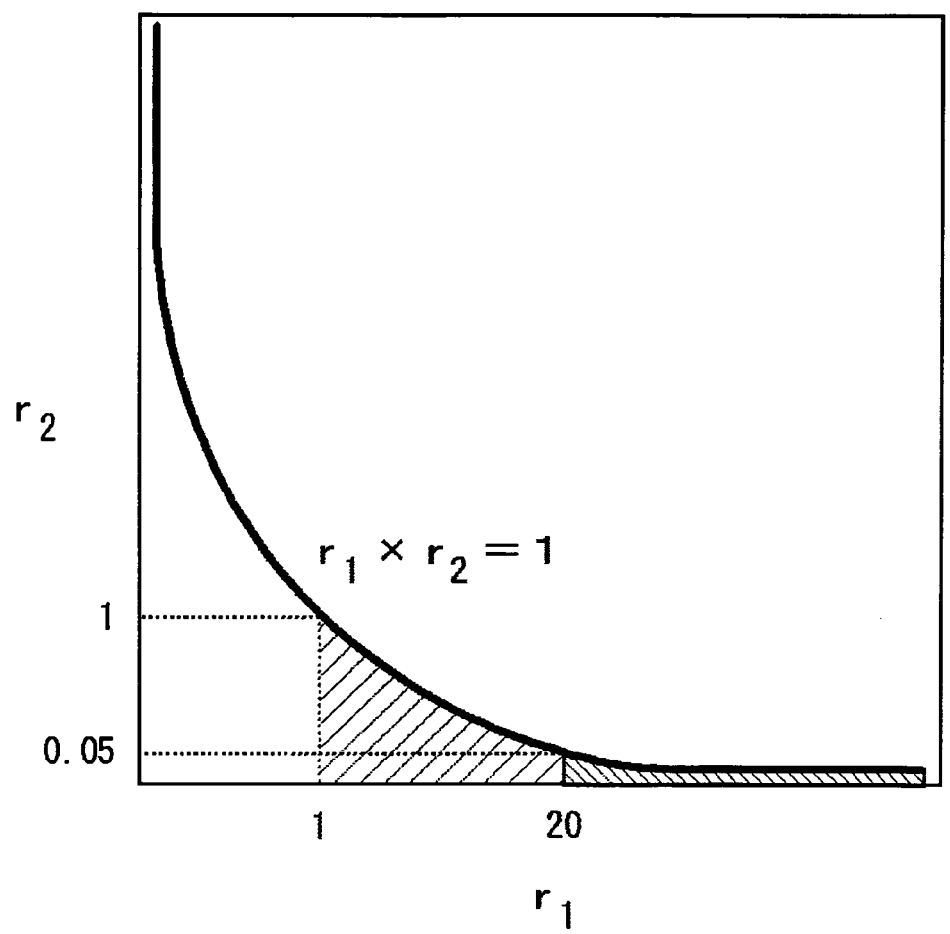
FIG. 1 shows a ratio of reaction rates for two types of reactions where a block copolymer is formed.

Hereafter, embodiments of the present invention are described.

DETAILED DESCRIPTION OF THE PREFERRED EMBODIMENTS

EXAMPLE 1

According to an embodiment of the present invention, a cationic conductor comprises a block copolymer comprising: a polymer moiety having a structural unit represented by formula (2):

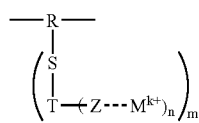

(2)

wherein R represents an organic group obtained via polymerization of monomer compounds having polymerizable unsaturated linkages; S represents an organic group bonded to R; T represents an n+1-valence organic group bonded to S through a single bond; Z represents a functional group capable of forming an ionic bond to or having coordination ability to a cation; $M^{k+}$ represents a k-valence cation; and n and m are each independently an integer of 1 or larger, provided that Z forms an ionic or coordination bond to a cation; and a polymer moiety having addition polymerizable monomers.

In the case of the cationic conductor of the present example, organic group S is bonded to organic group T through a single bond, and T freely rotates around this single bond. The compound of the present example exhibits cationic conductivity via easy migration and exchange of cations $M^{k+}$ coordinated to functional group Z between adjacent organic groups Ts.

It is important that a bond between organic groups S and T be a single bond. A bond between organic groups R and S is not limited to a single bond.

According to an embodiment of the present invention, a cationic conductor comprises a block copolymer comprising: a polymer moiety having a structural unit represented by formula (7), corresponding to formula (2) wherein T is an aryl group:

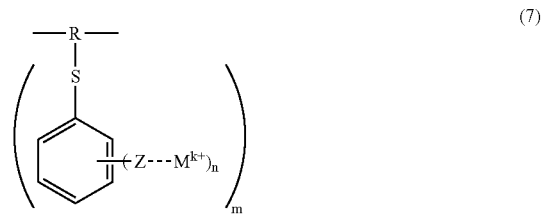

(7)

wherein R represents an organic group obtained via polymerization of monomer compounds having polymerizable unsaturated linkages; S is an organic group bonded to R and to a Z-bonded benzene derivative through a single bond; Z represents a functional group capable of forming an ionic bond to or having coordination ability to a cation; $M^{k+}$ represents a k-valence cation; and n and m are each independently an integer of 1 or larger, provided that Z forms an ionic or coordination bond to a cation; and a polymer moiety having addition polymerizable monomers.

According to a further embodiment of the present invention, a cationic conductor comprises a block copolymer comprising: a polymer moiety having a structural unit represented by formula (8), corresponding to formula (7) wherein S represents an amide group in which N (a nitrogen atom) is bonded to R and C (a carbon atom) is bonded to the aryl group:

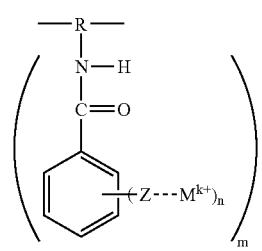

(8)

wherein R represents an organic group obtained via polymerization of monomer compounds having polymerizable unsaturated linkages; Z represents a functional group capable of forming an ionic bond to or having coordination ability to a cation; $M^{k+}$ represents a k-valence cation; and n and m are each independently an integer of 1 or larger, provided that Z forms an ionic or coordination bond to a cation; and a polymer moiety having addition polymerizable monomers.

In the case of a polymer electrolyte comprising an organic group-containing monomer that affects ionic conduction, a polymer molecular chain composed of continuing organic groups that affect ionic conduction is hard. Thus, it was deduced that ionic conduction would be inhibited at the interface between domains of the polymer molecular chain, which would result in deteriorated ionic conductivity.

Enhancement in ionic conductivity was attempted by copolymerizing such a monomer with a styrene monomer capable of a similar form of addition polymerization; however, no satisfactory effect was attained. Since the copolymer thus obtained is a random copolymer with an irregular sequence consisting of an organic group affecting ionic conduction and a styrene monomer that was used for copolymerization, it was deduced that a mechanism of conducting ions via single bond rotation would not function sufficiently. Thus, it was considered that sequence regulation must be carried out in a polymer of the organic group.

In general, a monomer that is subjected to addition polymerization exhibits changes in reactivity upon polymerization due to a type of a functional group that is bonded to an unsaturated hydrocarbon group of the monomer. When such monomer is copolymerized with a different type of monomer, different types of monomers may be irregularly or regularly aligned due to differences in reactivity. The Q-e value can be determined concerning the reactivity of an addition polymerizable monomer. Q represents a degree of resonance stabilization of the monomer, and e indicates the relative electric charge of unsaturated linkage.

Two types of monomers are designated as $M_1$ and $M_2$, and the Q-e values thereof are designated as $Q_1 \cdot e_1$ and $Q_2 \cdot e_2$, respectively. A radical is generated at the end of the polymer chain that is elongated via radical polymerization, and polymerization takes place when an unsaturated linkage of a monomer reacts to the radical. Where a radical at the terminus of a propagating polymer chain is generated from $M_1$ and an $M_1$ monomer is polymerized therewith, the reaction rate thereof is designated as $k_{11}$. Where a radical at the terminus of an elongating polymer chain is generated from $M_1$ and $M_2$ is polymerized therewith, the reaction rate thereof is designated as $k_{12}$. The ratio $r_1$ of the above reaction rates is represented by equation 1. Similarly, where a radical at the terminus of an elongating polymer chain is generated from $M_2$ and an $M_1$ or $M_2$ monomer is polymerized therewith, reaction rates thereof are designated as $k_{21}$, and $k_{22}$, respectively. The ratio $r_1$ is represented by equation 2.

The ratio of reaction rates $r_2$ and $r_2$ can be represented by the aforementioned Q-e values (equations 3 and 4).

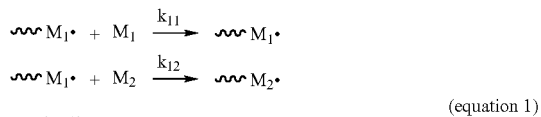

(equation 1)

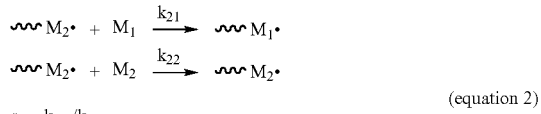

(equation 2)

$$r_1 = (Q_1/Q_2)\exp[-e_1(e_1-e_2)] \quad \text{(equation 3)}$$

$$r_2 = (Q_2/Q_1)\exp[-e_2(e_2-e_1)] \quad \text{(equation 4)}$$

$Q_1$, $e_1$: Q-e value of monomer $M_1$
$Q_2$, $e_2$: Q-e value of monomer $M_2$ The form of a copolymer can be regulated by monomer type selection for such copolymerization. When the conditions $r_1>1$ and $r_2<1$ are satisfied, $M_1$-$M_1$ and $M_2$-$M_2$ reactions are facilitated. Thus, a block copolymer comprising a recurring unit consisting of a structural unit of consecutively bound Ml monomers and a structural unit of consecutively bound $M_2$ monomersis generated. The ratios of reaction rates $r_1$ and $r_2$ when such structural unit is realized are $r_1 \times r_2 < 1$, $r_1 > 1$ and $0 < r_2 < 1$, and particularly preferably $r_1 \times r_2 < 1$, $r_1 > 20$ and $0 < r_2 < 0.05$, concerning a block copolymer (FIG. 1).

A block copolymer is comprised of a polymer moiety consisting of monomers including organic groups that affect conduction of ions aligned with a polymer moiety consisting of monomers to be copolymerized. It was deduced that an organic group that affects ionic conduction inhibited ionic conduction at the interface between domains of a continuing polymer molecular chain in the case of a homopolymer.

In contrast, it is assumed that a space between domains of the polymer molecular chain of a block copolymer, which is composed of continuing organic groups that affect ionic conduction, is bonded with the aid of a polymer moiety consisting of monomers used for copolymerization. Thus, ionic conductivity can be enhanced by the effects of assisting ionic conduction at the interface between domains or segmental motion of the polymer molecule realized by functioning as a plasticizer on a polymer molecular chain.

The structure of such block copolymer can be assayed via the nuclear magnetic resonance method. Since different types of addition polymerizable functional groups form a polymer, the structure of the copolymer can be determined by separately observing the peaks derived from the different functional groups.

In the present example, organic group T has at least 1 functional group Z that can be coordinated to a cation. When functional group Z is oxygen (O$^-$), examples of an organic group include phenolate anions such as hydroxy phenyl and dihydroxy phenyl groups. Alternatively, an oxygen atom in such anion may be substituted with a sulfur atom, i.e., a group in the form of thiophenyl or dithiophenyl may be used. When functional group Z is methoxy (—OCH$_3$), an organic group can be an alkoxy phenyl group such as a methoxy phenyl or dimethoxy phenyl group. An alkyl group such as a methoxy or ethoxy group can be used as an alkoxy group (—OR, wherein R represents an alkyl group). If the size of an alkyl group is enlarged, single bond rotation may be inhibited, or solubility of the cationic conductor may be adversely affected, which may result in deteriorated workability. An alkylthio group that is prepared by substituting an oxygen atom with a sulfur atom in an alkoxy group may also be used. Also, functional group Z can also be used in the form of ester (—O—C(=O)—R, —C(=O)O—R), an amino group (—NR$_1$R$_2$), an acyl group (—C(=O)—R), or carbonate (—O—C(=O)—OR).

Butyllithium, azobisisobutyronitrile, or peroxides such as benzoyl peroxide or t-hexyl peroxypivalate can be used as an initiator for polymerization where a polymer is generated. t-Hexyl peroxypivalate is particularly preferable.

In the present example, organic group R has a styrene skeleton. Originally, however, such organic group R is not particularly limited, and a variety of organic groups, such as a saturated hydrocarbon compound, an unsaturated hydrocarbon compound, or an aromatic hydrocarbon compound, can be employed. Such organic group is not limited to a hydrocarbon compound, and an organic group may contain elements, such as nitrogen, sulfur, or oxygen. Alternatively, part of such organic group may be substituted by halogen. The molecular weight thereof is not limited, and low-molecular-weight to high-molecular-weight compounds can be employed. A high-molecular-weight compound may be a polymer of low-molecular-weight monomers. The number of Z that is bonded to organic group T is not particularly limited, and substitution of at least one group per molecule represented by a general formula is sufficient. Alternatively, a plurality of monomers may be substituted. Polymerization can be carried out via addition polymerization.

When an addition polymerizable functional group of an ionic conductive functional group-containing monomer is a styryl group, vinyl acetate, isobutyrene, isobutyl vinyl ether, and ethylene are preferably used as monomers that are subjected to copolymerization.

In the present example, lithium is employed as a cation. Alkali metal ions such as sodium or potassium, alkaline earth metals such as magnesium, or a hydrogen ion can also be used. Among them, lithium ions are most preferable.

Lithium salts can also be used as lithium ion sources. Examples of lithium salts include $LiN(CF_3CF_2SO_2)_2$, $LiN(CF_3SO_2)_2$, $LiClO_4$, $LiPF_6$, $LiBF_4$, and $LiAsF_6$, and they can be used solely or in combinations of two or more. $LiN(CF_3CF_2SO_2)_2$ is particularly preferable. Preferably, at least 1 equivalent of lithium ions is added relative to one organic group Z, which is involved with lithium conduction, in terms of a molar proportion.

A concrete method 1 for synthesizing a cationic conductor consisting of a block copolymer comprising a polymer moiety having a structural unit represented by formula (8) and a polymer moiety having a monomer unit for copolymerization is described.

A monomer 1, i.e., (N-(di(2-aminoethyl)aminoethyl)-2,6-dimethoxy benzoic acid amide, (50 g) obtained by the method disclosed in JP Patent Publication No. 2004-6273 A and 4.9 ml of vinyl acetate are dissolved in 0.4 $dm^3$ of tetrahydrofuran, 1 $cm^3$ of hexane solution containing 70 wt % t-hexyl peroxypivalate is added thereto, and the mixture is stirred at 70° C. to obtain a block copolymer. The resulting copolymer (1 g) and 3 g of $LiN(CF_3CF_2SO_2)_2$ are dissolved in 20 ml of N-methylpyrrolidone, the resulting solution is cast on a poly(tetrafluoroethylene) sheet, the sheet is subjected to vacuum drying at 80° C., and a cast film of a block copolymer having a thickness of 100 μm is prepared.

This cast film is inserted between stainless (SUS 304) electrodes with diameters of 15 mm to prepare a test cell. An amplitude voltage of 10 mV is applied to this cell at room temperature to measure a.c. impedance. The frequency range is between 1 Hz and 1 MHz. Based on the reciprocal of the bulk ohmic value obtained by the measurement of a.c. impedance, ionic conductivity is determined. Ionic conductivity was found to be $1.5 \times 10^{-4}$ $Scm^{-1}$ at room temperature, which was higher than that of the polymer electrolyte prepared in Comparative Example 1.

Regulation of the polymer molecular chain sequence of an organic group that affects ionic conduction can enhance ionic conductivity of the polymer electrolyte.

EXAMPLE 2

According to an embodiment of the present invention, a cationic conductor comprises an alternating copolymer comprising an organic group represented by formula (4):

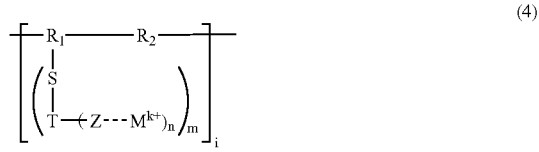

wherein $R_1$ and $R_2$ each independently represent an organic group obtained via polymerization of monomer compounds having addition polymerizable unsaturated linkages; S represents an organic group bonded to R; T represents an n+1-valence organic group bonded to S through a single bond; Z represents a functional group capable of forming an ionic bond to or having coordination ability to a cation; $M^{k+}$ represents a k-valence cation; n and m are each independently an integer of 1 or larger; and i represents the polymerization degree, provided that Z forms an ionic or coordination bond to a cation.

In the case of the cationic conductor of the present example, organic group S is bonded to organic group T through a single bond, and T freely rotates around this single bond. The compound of the present example exhibits cationic conductivity via easy migration and exchange of cations $M^{k+}$ coordinated to functional group Z between adjacent organic groups Ts.

It is important that a bond between organic groups S and T be a single bond. A bond between organic groups R and S is not limited to a single bond.

According to an embodiment of the present invention, a cationic conductor comprises an alternating copolymer having an aryl group represented by T in formula (4) and represented by formula (9):

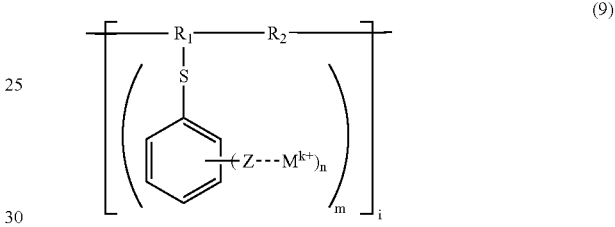

wherein $R_1$ and $R_2$ each independently represent an organic group obtained via polymerization of monomer compounds having addition polymerizable unsaturated linkages; S represents an organic group bonded to $R_1$ and to a Z-bonded benzene derivative through a single bond; Z represents a functional group capable of forming an ionic bond to or having coordination ability to a cation; $M^{k+}$ represents a k-valence cation; n and m are each independently an integer of 1 or larger; and i represents the polymerization degree, provided that Z forms an ionic or coordination bond to a cation.

According to another embodiment of the present invention, a cationic conductor comprises an alternating copolymer represented by formula (10), corresponding to formula (9) wherein S is an amide group in which N (a nitrogen atom) is bonded to R and C (a carbon atom) is bonded to the aryl group

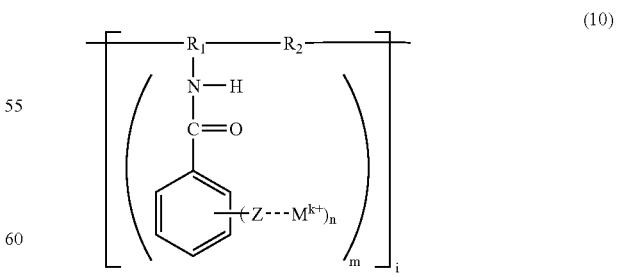

wherein $R_1$ and $R_2$ each independently represent an organic group obtained via polymerization of monomer compounds having addition polymerizable unsaturated linkages; Z represents a functional group capable of forming an ionic bond to or having coordination ability to a cation; $M^{k+}$ represents a k-valence cation; n and m are each independently an integer of 1 or larger; and i represents the polymerization degree, provided that Z forms an ionic or coordination bond to a cation.

In the case of a polymer electrolyte consisting of an organic group-containing monomer that affects ionic conduction, rotation at the time of ionic conduction is inhibited due to steric crowding in the functional group. This was assumed to lower ionic conductivity.

As described in Example 1, monomer type selection for copolymerization enables regulation of the form of the copolymer. When the values represented by $r_1$ and $r_2$ are excessively small and close to 0, reaction between different types of monomers is more likely to proceed compared to the case where reaction takes places between monomers of the same type. An alternating copolymer in which $M_1$ and $M_2$ are substantially regularly and alternately aligned is generated thereupon.

By selecting an appropriate monomer type for copolymerization, an alternating copolymer in which an organic group-containing monomer that affects ionic conduction is alternately aligned with a monomer to be copolymerized can be obtained. In such a case, a distance between organic groups that affect ionic conduction may be regulated to reduce the steric crowding in the functional groups and accelerate the rotation upon ionic conduction. Thus, enhancement in ionic conductivity can be expected.

Figure 2:
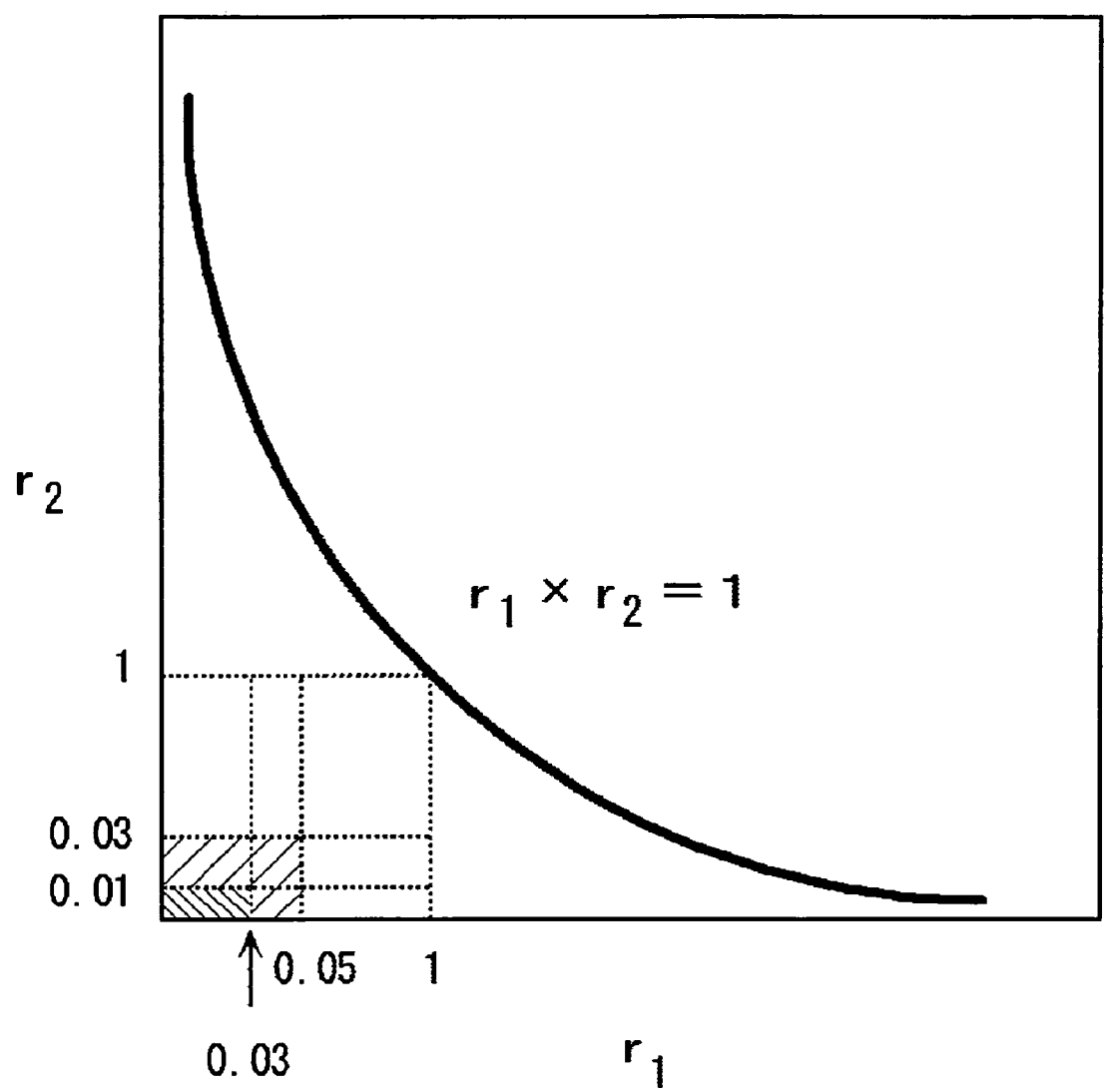
FIG. 2 shows a ratio of reaction rates for two types of reactions where an alternating copolymer is formed.
Figure 3:
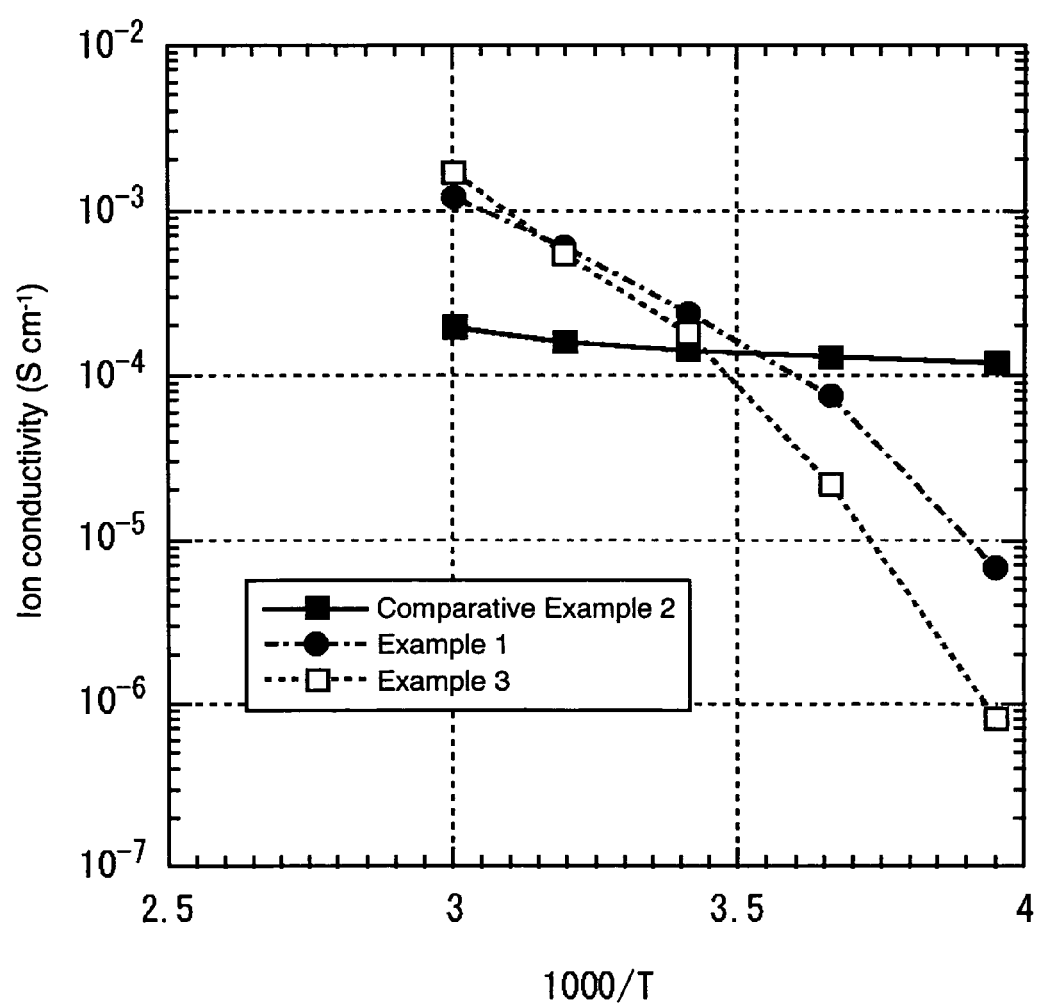
FIG. 3 shows the results of comparison of the cationic conductor prepared in Examples 1 and 3 of the present invention and a conventional cationic conductor via reciprocal plotting of the ionic conductivity and the temperature.

Ratios of reaction rates $r_1$ and $r_2$ where such alternating copolymer is obtained are preferably in the ranges of $0<r_1<0.5$ and $0<r_2<0.3$, and particularly preferably in the range of $0<r_1<0.3$ and $0<r_2<0.1$ (FIG. 2).

Such alternating copolymer structure can be confirmed via the nuclear magnetic resonance method. Since different types of addition polymerizable functional groups are alternately aligned, the alternating copolymer structure can be determined based on the fact that peaks derived from such functional groups are uniform and of a single type.

When a polymerizable functional group of a monomer having a functional group that affects ionic conduction is a styryl group, a monomer, such as maleic anhydride, N-phenyl maleimide, methyl maleic anhydride, citraconic anhydride, acrylonitrile, diethyl fumarate, vinylidene cyanide, p-nitrostyrene, methyl vinyl ketone, or methacrylonitrile, is preferably used for copolymerization.

A concrete method 1 for synthesizing a cationic conductor consisting of an alternating copolymer having a structural unit represented by formula (8) and a monomer for copolymerization is described.

A monomer 1 (50 g) and 9 g of N-phenyl maleimide are dissolved in 0.4 dm³ of tetrahydrofuran, 1 cm³ of hexane solution containing 70 wt % t-hexyl peroxypivalate is added thereto, and the mixture is stirred at 70° C. to obtain an alternating copolymer. The resulting copolymer (1 g) and 3 g of $LiN(CF_3CF_2SO_2)_2$ are dissolved in 20 ml of N-methylpyrrolidone, the resulting solution is cast on a poly(tetrafluoroethylene) sheet, the sheet is subjected to vacuum drying at 80° C., and a cast film of an alternating copolymer having a thickness of 100 μm is prepared.

This cast film was subjected to measurement of a.c. impedance in the same manner as in Example 1 to determine ionic conductivity. Ionic conductivity was found to be $4.8 \times 10^{-5}$ Scm⁻¹ at room temperature.

EXAMPLE 3

A monomer 1 (50 g) and 11.8 ml of acrylonitrile are dissolved in 0.2 dm³ of tetrahydrofuran, 1 cm³ of hexane solution containing 70 wt % t-hexyl peroxypivalate is added thereto, and the mixture is stirred at 70° C. to obtain an alternating copolymer. The resulting copolymer (1 g) and 3 g of $LiN(CF_3CF_2SO_2)_2$ are dissolved in 20 ml of N-methylpyrrolidone, the resulting solution is cast on a poly(tetrafluoroethylene) sheet, the sheet is subjected to vacuum drying at 80° C., and a cast film of an alternating copolymer having a thickness of 100 μm is prepared.

This cast film was subjected to measurement of a.c. impedance in the same manner as in Example 1 to determine ionic conductivity. Ionic conductivity was found to be $1.8 \times 10^{-4}$ Scm⁻¹ at room temperature, which was higher than that of the polymer electrolyte prepared in Comparative Example 1.

EXAMPLE 4

According to an embodiment of the present invention, a cationic conductor is composed of a mixture of: a polymer represented by formula (6):

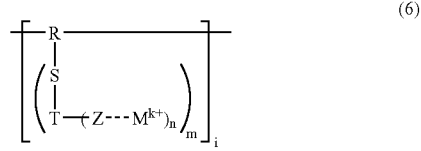

(6)

wherein R represents an organic group obtained via polymerization of monomer compounds having polymerizable unsaturated linkages; S represents an organic group bonded to R; T represents an n+1-valence organic group bonded to S through a single bond; Z represents a functional group capable of forming an ionic bond to or having coordination ability to a cation; $M^{k+}$ represents a k-valence cation; and n and m are each independently an integer of 1 or larger, provided that Z forms an ionic or coordination bond to a cation; and a different type of polymer.

In the case of a polymer electrolyte consisting only of an organic group-containing monomer that affects ionic conduction, a polymer molecular chain composed of continuing organic groups that affect ionic conduction is hard. Thus, it was deduced that inhibition of ionic conduction at the interface between domains of the polymer molecular chain would deteriorate ionic conductivity. In order to enhance conductivity, a polymer blend comprising polymers having different properties may be effective.

A "polymer blend" is prepared by mixing polymers having different properties. It is deduced that, via such procedure, a space between domains of a polymer molecular chain composed of continuing organic groups that affect ionic conduction be bridged and bonded with the aid of polymers used for blending. Therefore, enhanced ionic conductivity can be expected because of the effects of assisting ionic conduction at the interface between domains.

A polymer blend preferably comprises polymers, such as polyvinyl acetate, polymethyl methacrylate, polymethyl acrylate, and polylauryl methacrylate.

A homopolymer (3.0 g) comprising the monomer 1 obtained by the method disclosed in JP Patent Publication No. 2004-6273 A is dissolved in 60 ml of NMP. Polyvinyl acetate (0.3 g) is dissolved in 10 ml of NMP. These solutions are mixed with 8.2 g of $LiN(CF_3CF_2SO_2)_2$ to prepare a solution. The resultant is cast on a poly(tetrafluoroethylene) sheet, the sheet is subjected to vacuum drying at 80° C., and a cast film of a polymer blend having a thickness of 100 μm is prepared.

This cast film was subjected to measurement of a.c. impedance in the same manner as in Example 1 to determine ionic conductivity. Ionic conductivity is deduced to be higher at room temperature than that of the polymer electrolyte prepared in Comparative Example 1.

EXAMPLE 5

Figure 4:
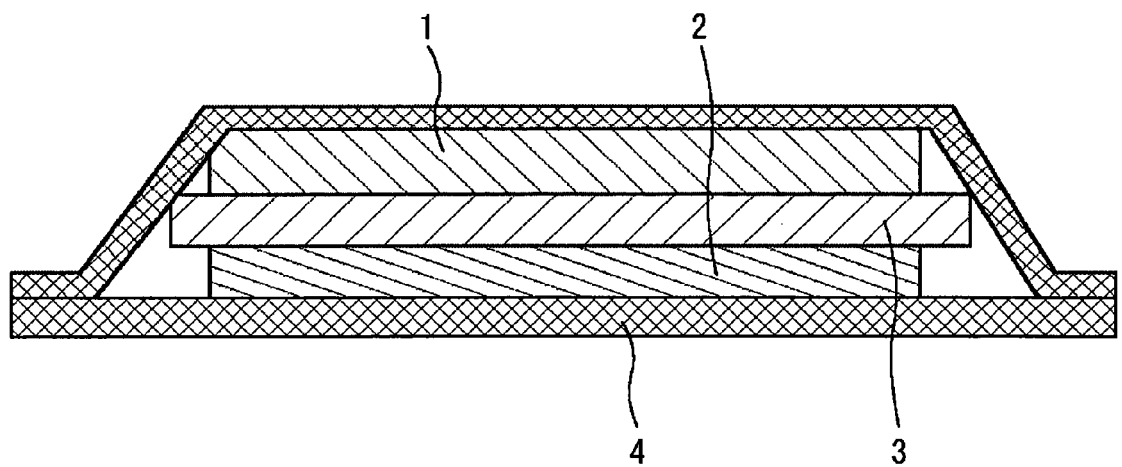
FIG. 4 shows the lithium secondary battery prepared in Example 7.

FIG. 4 shows a cross section of a lithium battery using a cationic conductive polymer electrolyte according to an embodiment of the present invention.

A lithium ionic conductive polymer electrolyte of the present example is a complex of a polymer and a lithium salt. Such electrolyte can be obtained by dissolving a monomer having an organic group that affects ionic conduction, a monomer for copolymerization, and a lithium salt in an organic solvent, subjecting the resulting solution to polymerization, and then removing an organic solvent. Alternatively, a block copolymer or an alternating copolymer is dissolved in an organic solvent, or a polymer having organic group-containing monomers that affect ionic conduction is dissolved in an organic solvent for a different type of polymer. A lithium salt is added thereto, and an organic solvent is then removed. Thus, a lithium ionic conductive polymer electrolyte can also be obtained.

A polymer electrolyte is prepared in the form of a sheet when it is used as an electrolyte for a lithium battery and is made to function as a separator between positive and negative electrodes. Such sheet-like polymer electrolyte can be obtained by dissolving a monomer having an organic group that affects ionic conduction, a monomer for copolymerization, and a lithium salt in an organic solvent, subjecting the resulting solution to addition polymerization by heating, and removing an organic solvent by evaporation. Alternatively, a block copolymer or an alternating copolymer is dissolved in an organic solvent, or a polymer having organic group-containing monomers that affect ionic conduction is dissolved in an organic solvent for a different type of polymer. A lithium salt is added thereto, the resultant is cast on a poly(tetrafluoroethylene) sheet, and an organic solvent is then removed by evaporation. Thus, a polymer electrolyte can also be obtained.

Examples of an organic solvent that dissolves polymer electrolyte and lithium salt include N-methylpyrrolidone, dimethylformamide, toluene, propylene carbonate, and γ-butyrolactone, which thoroughly dissolve lithium salt but do not react with a polymer.

A positive active material that reversibly intercalates and deintercalates lithium may be at least one of the following: a layered compound such as lithium cobalt oxide ($LiCoO_2$) or lithium nickel oxide ($LiNiO_2$); a layered compound in which at least one kind of transition metal has been substituted; lithium manganese oxide ($Li_{1+X}Mn_{2-X}O_4$, where X=0 to 0.33); $Li_{1+X}Mn_{2-X-Y}M_YO_4$, where M is at least one member selected from the group of metals consisting of Ni, Co, Cr, Cu, Fe, Al, and Mg, X=0 to 0.33, and Y=0 to 1.0, and 2-X-Y>0; $LiMnO_3$, $LiMn_2O_3$, $LiMnO_2$, or $LiMn_{2-X}M_XO_2$, where M is at least one member selected from the group of metals consisting of Co, Ni, Fe, Cr, Zn, and Ta, and X=0.01 to 0.1; $Li_2Mn_3MO_8$, where M is at least one member selected from the group of metals consisting of Fe, Co, Ni, Cu, and Zn); a copper-lithium oxide ($Li_2CuO_2$); an oxide of vanadium such as $LiV_3O_8$, $LiFe_3O_4$, $V_2O_5$, $V_6O_{12}$, VSe, or $Cu_2V_2O_7$; a disulphide compound; a mixture containing $Fe_2(MoO_4)_3$ etc; polyaniline; polypyrrole; and polythiophene.

A negative active material that reversibly intercalates and deintercalates lithium include: an easily graphitizable material obtained from natural graphite, petroleum coke, or coal pitch coke that has been subjected to heat treatment at high temperatures of 2500° C. or higher; mesophase carbon or amorphous carbon; carbon fiber; a lithium metal; a metal that alloys with lithium; or a carbon particle carrying a metal on the surface thereof. Examples thereof include metals or alloys selected from the group consisting of lithium, aluminum, tin, silicon, indium, gallium, and magnesium. These metals or their oxides may be utilized for the negative electrode active materials.

A battery with polymer electrolyte of the present example comprises a positive electrodes prepared from the aforementioned positive active material and a negative electrode prepared from the aforementioned negative active material separated by a sheet-like polymer electrolyte. Also, positive and negative electrodes containing a polymer electrolyte can be prepared in order to enhance adhesion between a positive or negative active material and a polymer electrolyte. In such a case, a monomer having an organic group that affects ionic conduction, a monomer for copolymerization, and a lithium salt are dissolved in an organic solvent, the resulting solution is cast on the positive and negative electrodes, and heat polymerization is then carried out. Alternatively, a copolymer comprising a lithium salt and an organic group that affects ionic conduction is dissolved in an organic solvent, the resulting solution is cast on the electrodes, and an organic solvent is then removed. Thus, such electrodes can be obtained. The thus-obtained positive and negative electrodes may be bonded to each other to obtain a battery with polymer electrolyte.

Such battery with polymer electrolyte is suitably mounted on electric equipment as shown below.

For example, such polymer electrolyte may be utilized for lithium secondary batteries as the electric power supplies for: electric automobiles; electric bicycles; personal computers; cellular phones; digital cameras; camcorders; portable minidisc players; personal digital assistants; wrist watches; radios; electronic personal organizers; electric tools; vacuum cleaners; toys; elevators; robots for emergency purposes; walking-aid machines for healthcare purposes; wheelchairs for healthcare purposes; moving beds for healthcare purposes; emergency electric supplies; load conditioners; and electric power storage systems (Example 8). Since no electrolytic fluid is used, it is expected that the safety level is enhanced and need of a protection circuit is eliminated. Thus, lithium secondary batteries can be used as rechargeable batteries for household use, the size thereof can be enlarged, and thus, they are suitable as dispersed power sources for household and regional use. The performance level can be maintained at low temperature no different from that at room temperature, fluid does not leak at high temperatures, and thus, the batteries can be used in a wide temperature range. Accordingly, they may also be utilized as the power supplies for military, space-exploration, or emergency purposes, as well as for consumer applications. Employing a hydrogen ion as $M^{k+}$ in formulae (1) to (6) enables the use thereof as an electrolytic film of a fuel cell.

COMPARATIVE EXAMPLE 1

A method for synthesizing a cationic conductor using a homopolymer comprising the monomer 1 obtained by the method disclosed in JP Patent Publication (Kokai) No. 2004-6273 A is described.

The obtained monomer 1 (140 g) was dissolved in 5 dm³ of tetrahydrofuran, 0.4 g of azobisisobutyronitrile was added thereto, and the mixture was stirred at 65° C. This reaction solution was added dropwise to 10 dm³ of n-hexane to obtain a polymer electrolyte 3 (poly(N-(4-vinylphenyl)-2,6-dimethoxy benzoic acid amide)). The resulting polymer electrolyte 3 (50 g) was dissolved in 2 dm³ of N-methylpyrrolidone, and 98 g of lithium trifluorosulfonimide salt was added thereto, followed by mixing. Thereafter, the resultant was cast on a poly(tetrafluoroethylene) sheet and subjected to vacuum drying at 60° C. to obtain a cast film having a thickness of 100 μm. With the use of this cast film, a test cell was prepared in the same manner as in Example 1 to determine ionic conductivity. Ionic conductivity was found to be $1.4 \times 10^{-4}$ Scm⁻¹.

COMPARATIVE EXAMPLE 2

A.c. impedance was measured in order to examine the temperature dependence of the ionic conductivity using the test cell prepared in Comparative Example 1. The test cell was allowed to stand in a thermostat maintained at the given temperature level for 30 minutes, and the measurement was carried out in a manner such that the cell was set in the thermostat. Ionic conductivity was determined in the same manner as in Comparative Example 1.

All the publications, patents and patent applications cited herein are incorporated herein by reference in their entirely.

The invention claimed is:

1. A cationic conductor comprising a block copolymer comprising: a polymer moiety having a structural unit represented by formula (1):

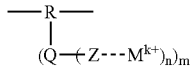
(1)

wherein R represents an organic group obtained via polymerization of monomer compounds having polymerizable unsaturated linkages; Q represents an n+1-valence organic group bonded to R through a single bond; Z represents a functional group capable of forming an ionic bond to or having coordination ability to a cation; $M^{k+}$ represents a k-valence cation; and n and m are each independently an integer of 1 or larger, provided that Z forms an ionic or coordination bond to a cation; and a polymer moiety having addition polymerizable monomers.

2. The cationic conductor according to claim 1, wherein Q in formula (1) has an aryl group.

3. The cationic conductor according to claim 1, wherein Z in formula (1) is a hydroxy ion group.

4. The cationic conductor according to claim 1, wherein Z in formula (1) is a methoxy group.

5. The cationic conductor according to claim 1, wherein cation $M^{k+}$ in formula (1) is a lithium ion.

6. The cationic conductor according to claim 1, wherein Z in formula (1) is a monovalent anion group and cation $M^{k+}$ is coordinated to the anion group.

7. The cationic conductor according to claim 1, wherein Q comprises an aryl group.

8. A lithium secondary battery comprising a positive electrode having a positive active material that can intercalate and deintercalate lithium and a negative electrode having a negative active material that can intercalate and deintercalate lithium that are wound or laminated via an interposing polymer electrolyte, wherein the polymer electrolyte comprises the cationic conductor according to claim 1.

* * * * *